(12) United States Patent
Miyazaki et al.

(10) Patent No.: US 8,424,647 B2
(45) Date of Patent: Apr. 23, 2013

(54) LUBRICATION SYSTEM FOR OUTBOARD MOTOR

(75) Inventors: Satoshi Miyazaki, Shizuoka (JP); Toshihiro Nozue, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 621 days.

(21) Appl. No.: 12/412,590

(22) Filed: Mar. 27, 2009

(65) Prior Publication Data
US 2009/0194369 A1 Aug. 6, 2009

(30) Foreign Application Priority Data
Oct. 19, 2007 (JP) .................................. 2007-272838

(51) Int. Cl.
*F01M 1/10* (2006.01)
(52) U.S. Cl.
USPC ........................................................ 184/6.24
(58) Field of Classification Search ................ 184/6.24, 184/105.3; 123/195, 196
See application file for complete search history.

(56) References Cited

U.S. PATENT DOCUMENTS

| | | | | |
|---|---|---|---|---|
| 4,452,195 A | * | 6/1984 | Matsumoto et al. | .... 123/195 AC |
| 4,493,295 A | * | 1/1985 | Ampferer | .................. 123/41.86 |
| 5,168,844 A | * | 12/1992 | Waelput | ..................... 123/196 A |
| 5,514,015 A | * | 5/1996 | Okazawa et al. | ........... 440/88 L |
| 5,778,848 A | * | 7/1998 | Takahashi et al. | ....... 123/196 W |
| 6,076,495 A | * | 6/2000 | Takahashi et al. | ....... 123/196 W |
| 6,401,682 B1 | * | 6/2002 | Nozue | ....................... 123/196 W |
| 6,918,369 B2 | * | 7/2005 | Takahashi | .................. 123/192.2 |
| 7,503,318 B2 | * | 3/2009 | Takahashi et al. | ............ 123/572 |

FOREIGN PATENT DOCUMENTS

| | | |
|---|---|---|
| JP | 09-273406 A | 10/1997 |
| JP | 2001-271622 A | 10/2001 |
| JP | 2006-258105 A | 9/2006 |

OTHER PUBLICATIONS

Official Communication issued in corresponding Japanese Patent Application No. 2007-272838, mailed on Sep. 27, 2011.

* cited by examiner

*Primary Examiner* — Michael Mansen
*Assistant Examiner* — Michael Riegelman
(74) *Attorney, Agent, or Firm* — Keating & Bennett, LLP

(57) ABSTRACT

In an outboard engine, an upstream oil return path is connected to an oil passage upstream of an oil filter to return lubrication oil that is accumulated in the oil passage upstream of the oil filter to an oil pan. A downstream oil return path is connected to an oil passage downstream of the oil filter to return lubrication oil that is accumulated in oil passages and a main gallery downstream of the oil filter to the oil pan. The lubrication oil accumulated in a portion of an oil passage downstream of the oil filter is hindered from flowing to the outside even if the oil filter is removed when the engine is stopped.

5 Claims, 7 Drawing Sheets

LUBRICATION SYSTEM FOR OUTBOARD MOTOR

BACKGROUND OF THE INVENTION

1. Field of the Invention

The present invention relates to a lubrication system for an outboard motor. More specifically, the present invention is suitably applicable to a scheme for preventing oil accumulated in an oil passage downstream of an oil filter provided in a lubrication system for an outboard motor from flowing back and flowing to the outside of the outboard motor.

2. Description of the Related Art

An engine of an outboard motor includes a lubrication system for circulating lubrication oil in the engine to lubricate sliding surfaces of a crankshaft, a camshaft, and so forth. The lubrication system includes an oil filter for filtering lubrication oil. An oil leak hole is formed in an oil relief valve to return lubrication oil that is accumulated in a portion of an oil passage upstream of the oil filter to an oil pan when the engine is stopped.

JP-A-Hei 9-273406, for example, discloses a scheme for efficiently returning lubrication oil to an oil pan by allowing lubrication oil, which has lubricated bearing portions for a crankshaft and which is sticking to the rotating crankshaft, to smoothly flow to the bottom of a crank chamber. This is achieved by forming vertically communicating oil return holes in crankcase-side bearing components defining journal bearing portions in a crank chamber in the vicinity of a crankcase wall that faces the cylinders.

The conventional lubrication system for an outboard motor can return lubrication oil that is accumulated in the portion of the oil passage upstream of the oil filter to the oil pan. However, the conventional system cannot return lubrication oil that is accumulated in a portion of the oil passage downstream of the oil filter to the oil pan. Thus, the lubrication oil remains accumulated in the portion of the oil passage downstream of the oil filter when the engine is stopped. Therefore, when the oil filter is removed from the conventional lubrication system for an outboard motor for replacement of the oil filter, for example, the lubrication oil accumulated in the portion of the oil passage downstream of the oil filter flows back in the direction of the oil filter, and flows to the outside to soil the outboard motor.

According to the scheme disclosed in JP-A-Hei 9-273406, lubrication oil after lubricating the bearing portions for the crankshaft flows via the oil return holes to the bottom of the crank chamber. However, lubrication oil before lubricating the bearing portions for the crankshaft remains accumulated in the downstream portion of the oil passage when the engine is stopped. Therefore, when the oil filter is removed from the lubrication system to which the scheme disclosed in JP-A-Hei 9-273406 is applied, the lubrication oil accumulated in the oil passage downstream of the oil filter flows back in the direction of the oil filter, and flows to the outside so as to soil the outboard motor.

SUMMARY OF THE INVENTION

In order to overcome the problems described above, preferred embodiments of the present invention provide a lubrication system for an outboard motor that can prevent lubrication oil accumulated in a portion of an oil passage downstream of an oil filter from flowing to the outside even if the oil filter is removed when an engine is stopped.

In order to solve the foregoing problems described above, the lubrication system for an outboard motor in accordance with a first preferred embodiment of the present invention includes an oil passage arranged to guide lubrication oil to a movable member of an engine; an oil pump arranged to pump the lubrication oil into the oil passage; an oil filter arranged to filter the lubrication oil to be guided to the movable member; and an oil return path arranged to return the lubrication oil that is accumulated in a portion of the oil passage downstream of the oil filter to an oil pan.

The configuration allows lubrication oil accumulated in the portion of the oil passage downstream of the oil filter to return to the oil pan even if the oil filter is removed when the engine is stopped. Therefore, it is possible to prevent lubrication oil accumulated in the portion of the oil passage downstream of the oil filter from flowing to the outside, and to prevent the outboard motor from being soiled.

According to the lubrication system for an outboard motor in accordance with a second preferred embodiment of the present invention, the oil return path is preferably disposed below the oil filter.

The configuration allows all the lubrication oil accumulated above the oil filter, of the lubrication oil accumulated in the portion of the oil passage downstream of the oil filter, to return to the oil pan, and allows lubrication oil accumulated in a space inside the oil filter downstream of a filter paper to return to the oil pan. Thus, it is possible to prevent lubrication oil from returning in the direction of the oil filter, and to prevent lubrication oil accumulated in the portion of the oil passage downstream of the oil filter from flowing to the outside, even if the oil filter is removed.

According to the lubrication system for an outboard motor in accordance with a third preferred embodiment of the present invention, the oil return path is connected to a lower end of a main gallery provided in a cylinder block and parallel to a crank axis.

The configuration allows lubrication oil accumulated above the oil filter, of the lubrication oil accumulated in the portion of the oil passage downstream of the oil filter, to efficiently return to the oil pan, and also allows lubrication oil accumulated in a space inside the oil filter downstream of a filter paper to return to the oil pan, without performing complicated processing of the engine. Thus, it is possible to prevent lubrication oil from returning in the direction of the oil filter while minimizing the cost increase.

The lubrication system for an outboard motor in accordance with a fourth preferred embodiment of the present invention further includes a hollow portion arranged in the cylinder block so as to communicate with the portion of the oil passage downstream of the oil filter, the hollow portion opening into a space communicating with the oil pan; and a fitted plug fitted in the hollow portion so as to block the oil passage communicating with the hollow portion. The oil return path is an oil leak hole provided in the fitted plug.

According to this configuration, lubrication oil accumulated in the portion of the oil passage downstream of the oil filter can be returned to the oil pan by fitting the fitted plug in which the oil leak hole is provided in the hollow portion. Thus, the oil leak hole can be provided without directly processing the cylinder block and the crankcase. This not only facilitates forming the oil leak hole but also reduces the diameter of the oil leak hole without complicating the manufacturing process. Thus, even in the case where the oil leak hole leading to the portion of the oil passage downstream of the oil filter is provided, it is possible to minimize the adverse effect on the rise in hydraulic pressure at the start of engine operation, and to prevent cost increases.

The lubrication system for an outboard motor in accordance with a fifth preferred embodiment of the present invention further includes an electromagnetic valve provided in the oil return path to open and close according to the operation of the engine.

The configuration prevents lubrication oil accumulated in the portion of the oil passage downstream of the oil filter from returning in the direction of the oil filter when the engine is stopped, without permitting the lubrication oil from leaking from the downstream portion of the oil passage when the engine is operating. Thus, it is possible to prevent lubrication oil accumulated in the portion of the oil passage downstream of the oil filter from flowing to the outside.

According to various preferred embodiments of the present invention, it is possible to prevent lubrication oil accumulated in a portion of an oil passage downstream of an oil filter from flowing to the outside, and to prevent an outboard motor from being soiled, even if the oil filter is removed when an engine is stopped.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, description will be made of lubrication systems for an outboard motor in accordance with preferred embodiments of the present invention with reference to the drawings.

Figure 1:
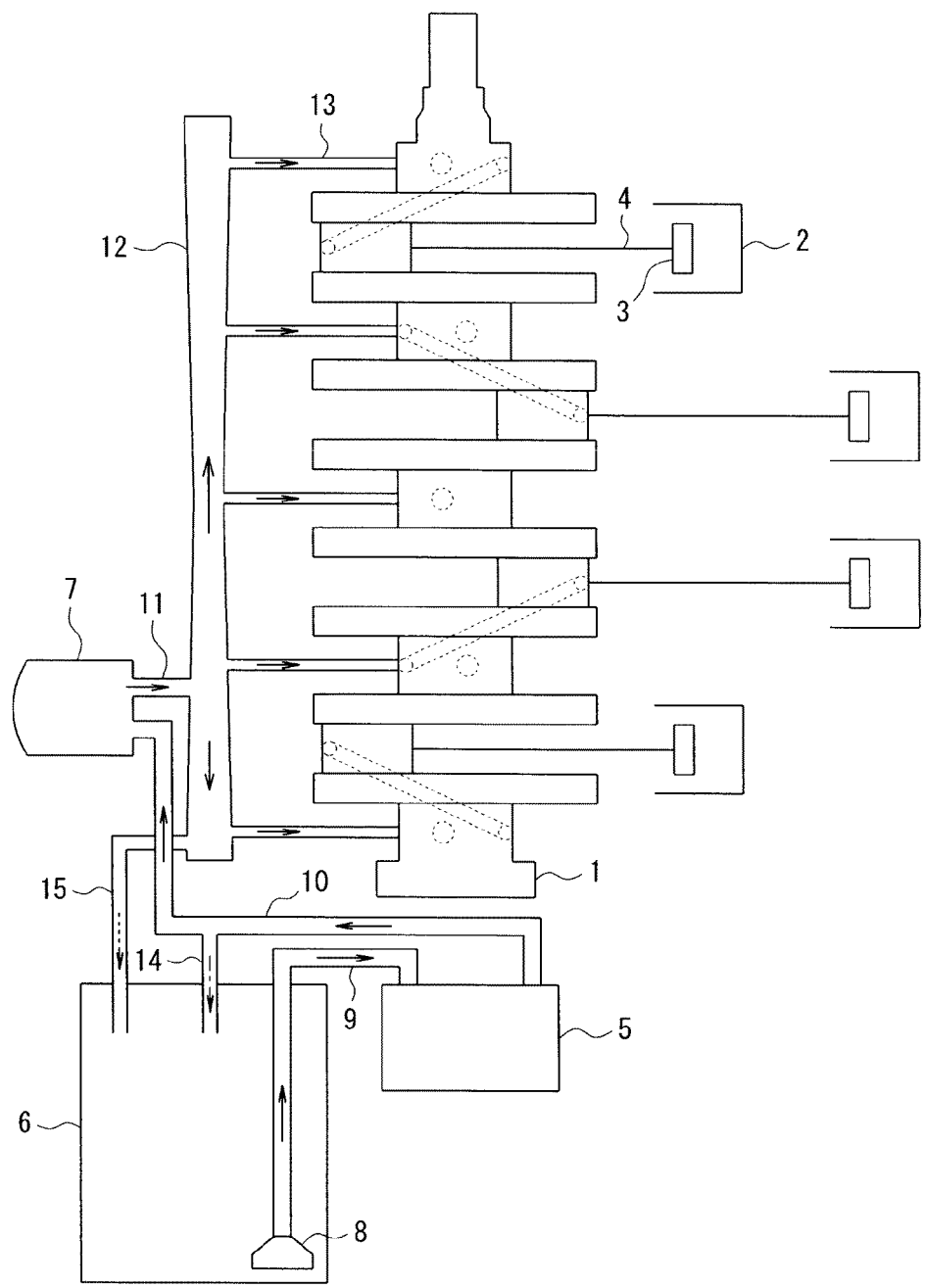
FIG. 1 is a cross-sectional view schematically showing the configuration of a lubrication system for an outboard motor in accordance with a first preferred embodiment of the present invention.

FIG. 1 is a cross-sectional view schematically showing the configuration of a lubrication system for an outboard motor in accordance with a first preferred embodiment of the present invention.

As shown in FIG. 1, an engine installed in the outboard motor includes a crankshaft 1 for converting reciprocal motion of pistons 3 provided in cylinders 2 into rotational motion. The cylinders 2 and the pistons 3 are preferably disposed to extend horizontally. The crankshaft 1 is preferably disposed with the crank axis extending vertically, and connected to the pistons 3 via connecting rods 4.

The lubrication system for the outboard motor includes oil passages 9, 10, 11, 13 and a main gallery 12 arranged to guide lubrication oil to movable members of the engine; an oil pump 5 arranged to pump lubrication oil into the oil passages 9, 10, 11, 13 and the main gallery 12; an oil pan 6 arranged to receive and contain lubrication oil after lubrication; and an oil filter 7 arranged to filter lubrication oil to be guided to the movable members of the engine.

Examples of the movable members to which lubrication oil is guided include sliding surfaces of the crankshaft 1, the cylinders 2, a camshaft (not shown), a rocker shaft (not shown), etc. The oil pump 5 may be driven via the crankshaft 1, and may be disposed at the connection between the crankshaft 1 and a drive shaft, for example. The main gallery 12 may be provided in a cylinder block and parallel to the crank axis. The main gallery 12 can guide lubrication oil pumped from the oil pump 5 vertically to distribute the lubrication oil to the oil passages 13, etc.

An oil strainer 8 is preferably disposed in the oil pan 6. The oil strainer 8 is connected to the oil inlet port of the oil pump 5 via the oil passage 9. The oil outlet port of the oil pump 5 is connected to the oil inlet port of the oil filter 7 via the oil passage 10. The oil outlet port of the oil filter 7 is connected to the main gallery 12 via the oil passage 11. The oil passages 13 are branched from the main gallery 12 to lead to the sliding surfaces of the crankshaft 1.

An upstream oil return path 14 is connected to the oil passage 10 upstream of the oil filter 7 to return lubrication oil that is accumulated in the oil passage 10 upstream of the oil filter 7 to the oil pan 6. A downstream oil return path 15 is connected to the oil passage downstream of the oil filter 7 to return lubrication oil that is accumulated in the oil passages 11, 13 and the main gallery 12 downstream of the oil filter 7 to the oil pan 6.

To create the upstream oil return path 14, an oil leak hole may be provided in an oil relief valve, or a hole leading to the oil passage 10 may be provided directly in the crankcase or the cylinder block, for example. As the downstream oil return path 15, an oil leaking hole may be provided in a fitted plug fitted in a hollow portion communicating with the oil passage, or a hole leading to the oil passage 11 or the main gallery 12 may be provided directly in the crankcase or the cylinder block, for example. The downstream oil return path 15 is preferably disposed below the oil filter 7, and may be connected to the lower end of the main gallery 12, for example.

When the engine operates, reciprocal motion of the pistons 3 provided in the cylinders 2 is transmitted via the connecting rods 4 to the crankshaft 1 and converted into rotational motion. As the crankshaft 1 rotates, the oil pump 5 operates to suck lubrication oil accumulated in the oil pan 6 via the oil strainer 8, as indicated by the solid arrows. The lubrication oil flows into the oil pump 5 through the oil passage 9, and is pumped into the oil filter 7 via the oil passage 10. After being filtered by the oil filter 7, the lubrication oil is delivered to the main gallery 12 via the oil passage 11 and distributed to the oil passages 13 via the main gallery 12. Thus, the lubrication oil is delivered to lubricate the sliding surfaces of the crankshaft 1 and then falls down and returns into the oil pan 6 through an oil return passage (not illustrated in FIG. 1).

When the engine is stopped, on the other hand, the oil pump 5 is also stopped. Thus, lubrication oil accumulated in the oil passage 10 upstream of the oil filter 7 flows back through the oil passage 10, and returns into the oil pan 6 via the upstream oil return path 14, as indicated by the dashed arrow. The lubrication oil accumulated in the oil passage 10 upstream of the oil filter 7 is cleared in this way.

Meanwhile, lubrication oil accumulated in the oil passages 11, 13 and the main gallery 12 downstream of the oil filter 7 flows back through the oil passages 11, 13 and the main gallery 12, and returns into the oil pan 6 via the downstream oil return path 15, as indicated by the dotted arrow. The lubrication oil accumulated in the oil passages 11, 13 and the main gallery 12 downstream of the oil filter 7 is cleared in this way.

The configuration prevents lubrication oil accumulated in the oil passages 11, 13 and the main gallery 12 downstream of the oil filter 7 from flowing to the outside, and also prevents lubrication oil accumulated in a space inside the oil filter 7 downstream of a filter paper from flowing to the outside, even if the oil filter 7 is removed when the engine is stopped. It is thus possible to prevent the outboard motor from being soiled.

In the case where the downstream oil return path 15 is provided, an electromagnetic valve that opens and closes according to the operation of the engine may be provided in the downstream oil return path 15 to prevent the leakage of lubrication oil from the oil passage downstream of the oil filter 7 into the oil pan 6 when the engine is operating. In the case where the electromagnetic valve is provided in the downstream oil return path 15, the electromagnetic valve may be controlled so as to close when the engine is operating and open when the engine is stopped.

Figure 2:
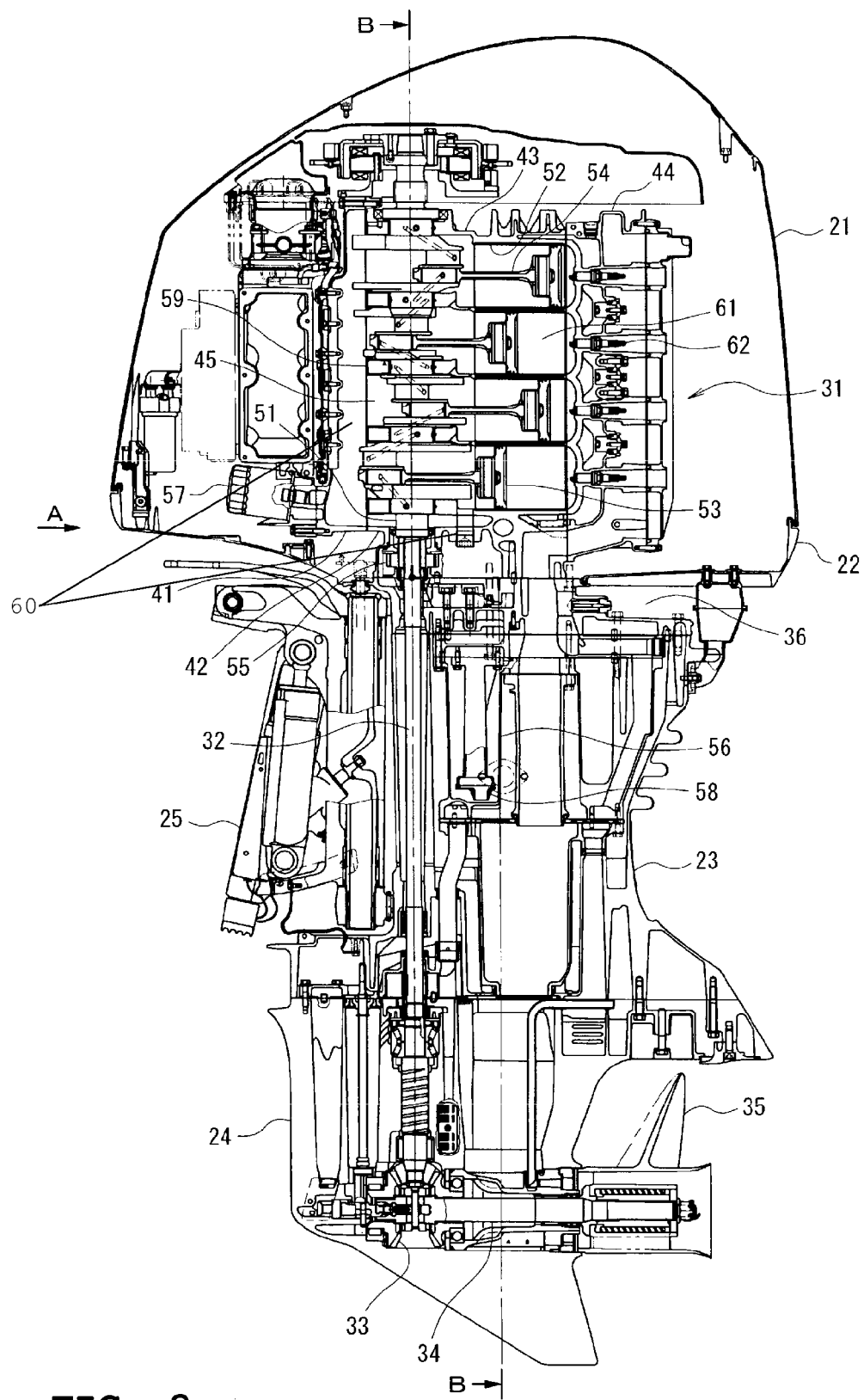
FIG. 2 is a cross-sectional view schematically showing the configuration of an outboard motor to which a lubrication system in accordance with a second preferred embodiment of the present invention is applied.

FIG. 2 is a cross-sectional view schematically showing the configuration of an outboard motor to which a lubrication system in accordance with a second preferred embodiment of the present invention is applied.

As shown in FIG. 2, the outboard motor includes an upper cowling 21, a lower cowling 22, an upper casing 23, and a lower casing 24, arranged in this order from top to bottom. The upper cowling 21 and the lower cowling 22 house an engine 31. The upper casing 23 houses a drive shaft 32. A bracket 25 is attached to the front of the upper casing 23. The lower casing 24 houses a bevel gear 33 and a propeller shaft 34. A propeller 35 is mounted at the rear of the lower casing 24. The upper cowling 21 is removably attached to the lower cowling 22. The engine 31 can be exposed to the outside of the outboard motor for checking the engine 31 or replacing an oil filter 57 provided in the engine 31, by removing the upper cowling 21.

As the engine 31, a water-cooled 4-cycle V-8 engine may be used, for example. However, another type of engine may also be used such as a V-6 engine or an inline multi-cylinder engine, for example.

The engine 31 is disposed in the upper cowling 21 and the lower cowling 22 with the crank axis of a crankshaft 51 extending vertically. The engine 31 is attached to an exhaust guide 36 disposed between the lower cowling 22 and the upper casing 23. The crankshaft 51 is connected to the drive shaft 32 so as to transmit power to the propeller 35 sequentially through the drive shaft 32, the bevel gear 33, and the propeller shaft 34.

The engine 31 includes a crank cover 41, a crankcase 42, a cylinder block 43, and a cylinder head 44, arranged in this order from front to rear. A crank chamber 45 is provided in the crankcase 42 and the cylinder block 43. The crank chamber 45 houses the crankshaft 51. The crankshaft 51 is supported by the crankcase 42 and the cylinder block 43 for free rotation about the crank axis. The crank cover 41 covers the front side of the crankcase 42. The crank chamber 45 is partitioned vertically by cylinders with partition walls 59. Cylinders 52 are arranged in the cylinder block 43 so as to extend horizontally. Pistons 53 are inserted in the cylinders 52 to define combustion chambers 61. The pistons 53 are connected to the crankshaft 51 via connecting rods 54.

The cylinder head 44 covers the rear side of the cylinder block 43. In the cylinder head 44 are disposed spark plugs 62, intake valves (not shown), exhaust valves (not shown), camshafts (not shown), etc.

The lubrication system of the engine 31 includes an oil pump 55 arranged to pump lubrication oil into the engine 31, an oil pan 56 arranged to receive lubrication oil through an oil return passage 60 after lubricating the engine 31, and an oil filter 57 arranged to filter the lubrication oil. The oil pump 55 is disposed between the crankshaft 51 and the drive shaft 32. The oil pump 55 may be operated as the crankshaft 51 is rotated. The oil pan 56 is disposed below the engine 31. An oil strainer 58 is disposed in the oil pan 56. The oil filter 57 is disposed on a side of the engine 31 at the crank cover 41.

Figures 3A, 3B:
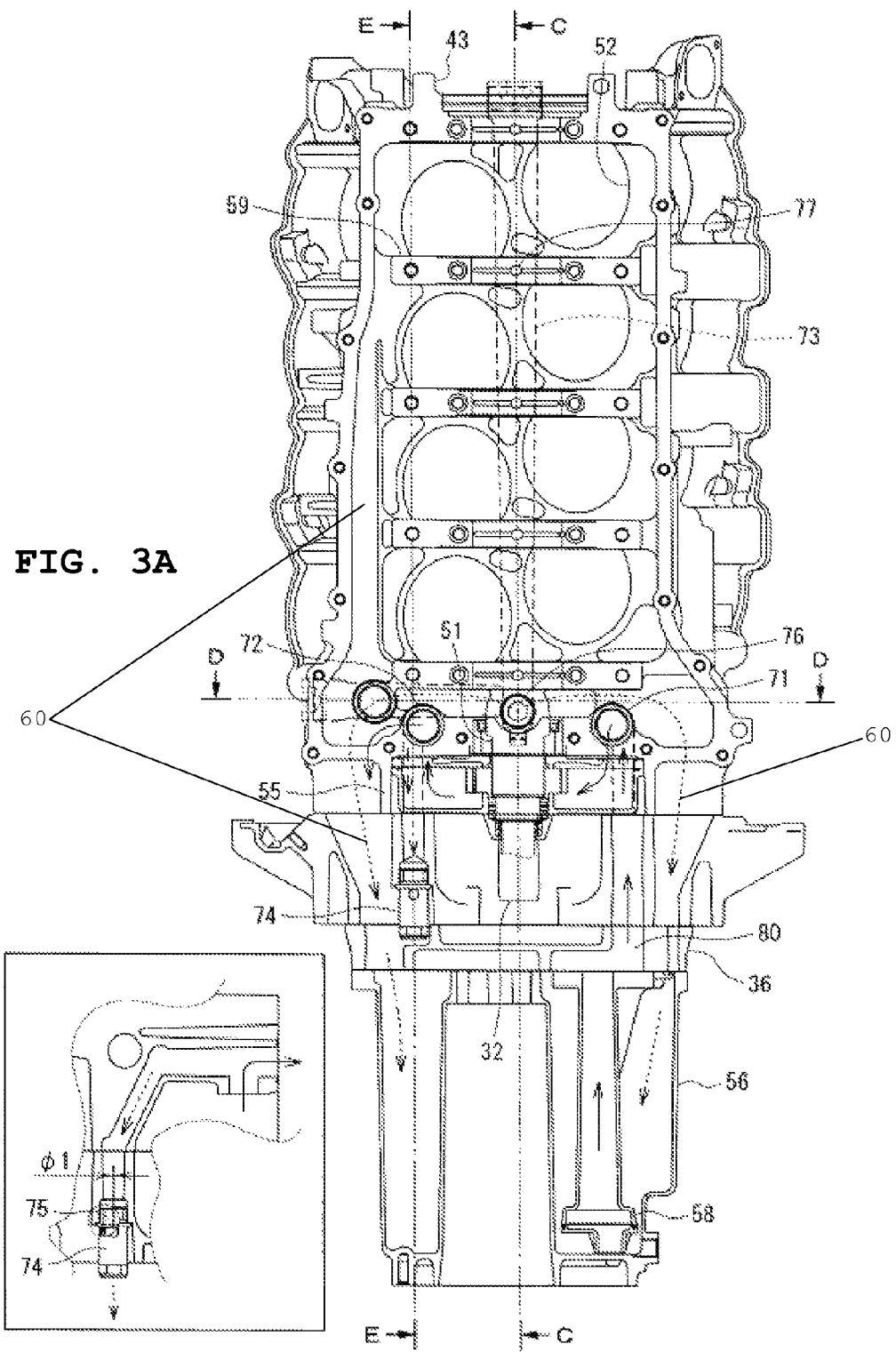
FIG. 3A is a cross-sectional view taken along the line B-B of FIG. 2.
FIG. 3B is a cross-sectional view taken along the line E-E of FIG. 3A.
Figure 4A:
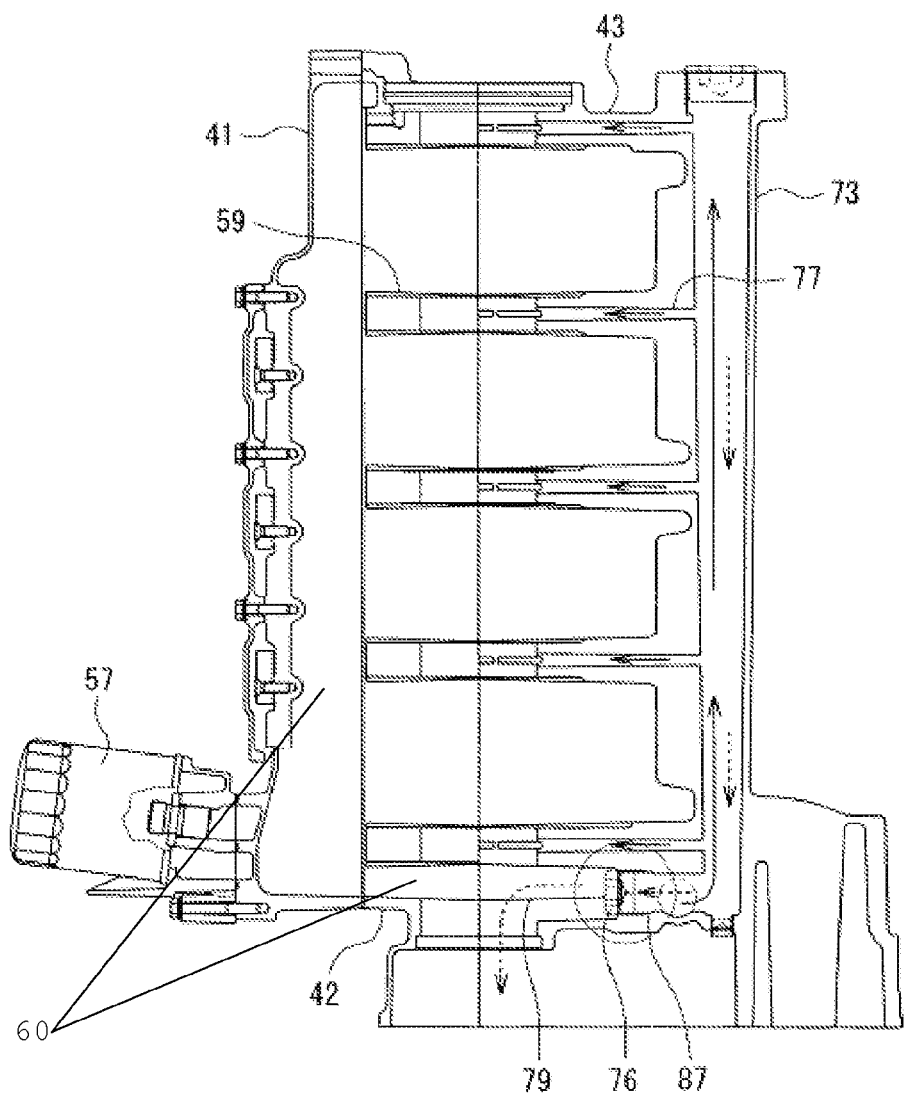
FIG. 4A is a cross-sectional view taken along the line C-C of FIG. 3A.
Figure 4B:
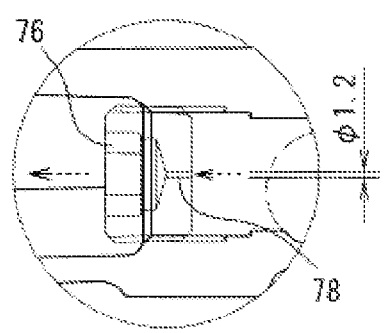
FIG. 4B is a cross-sectional view showing an enlarged portion around a fitted plug 76 of FIG. 4A.
Figure 5:
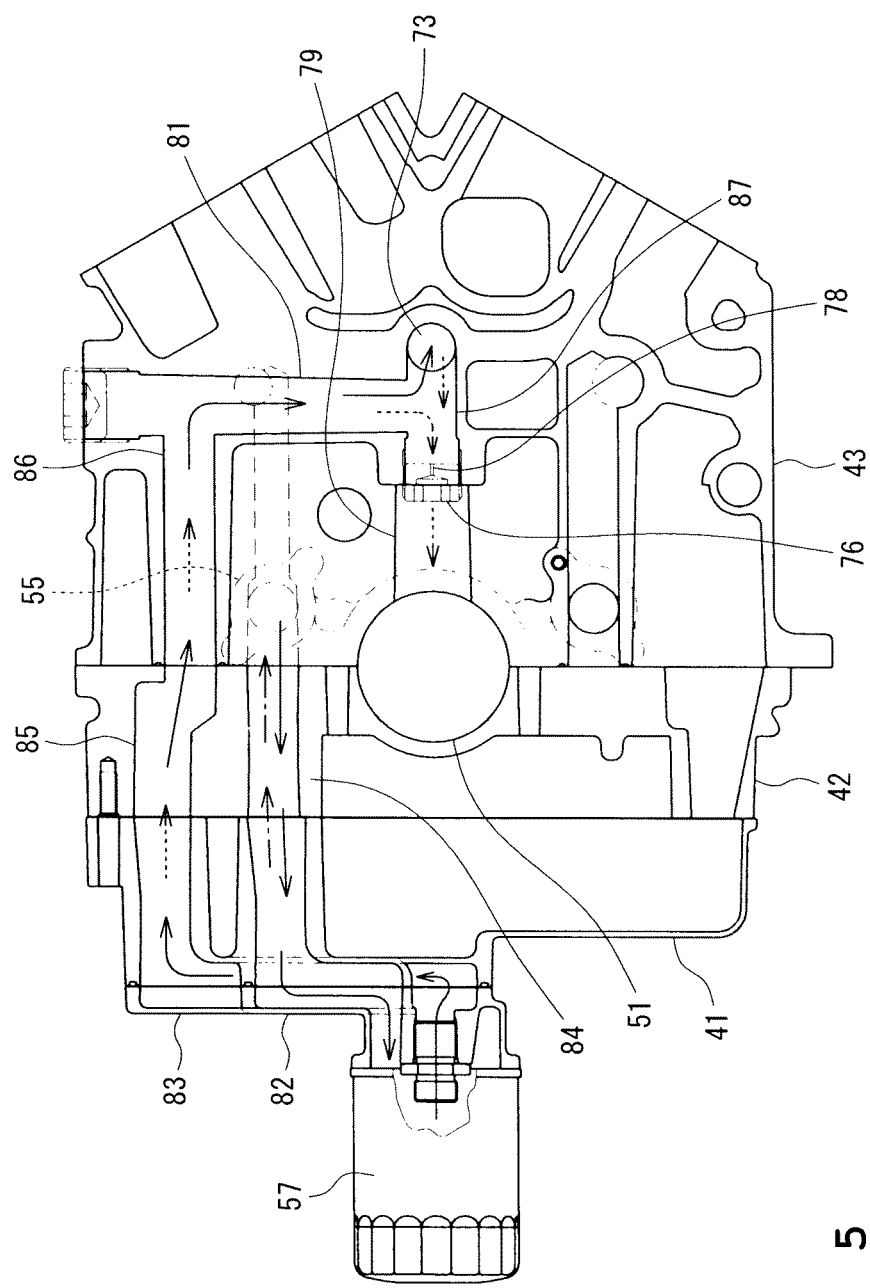
FIG. 5 is a cross-sectional view taken along the line D-D of FIG. 3A.
Figure 6:
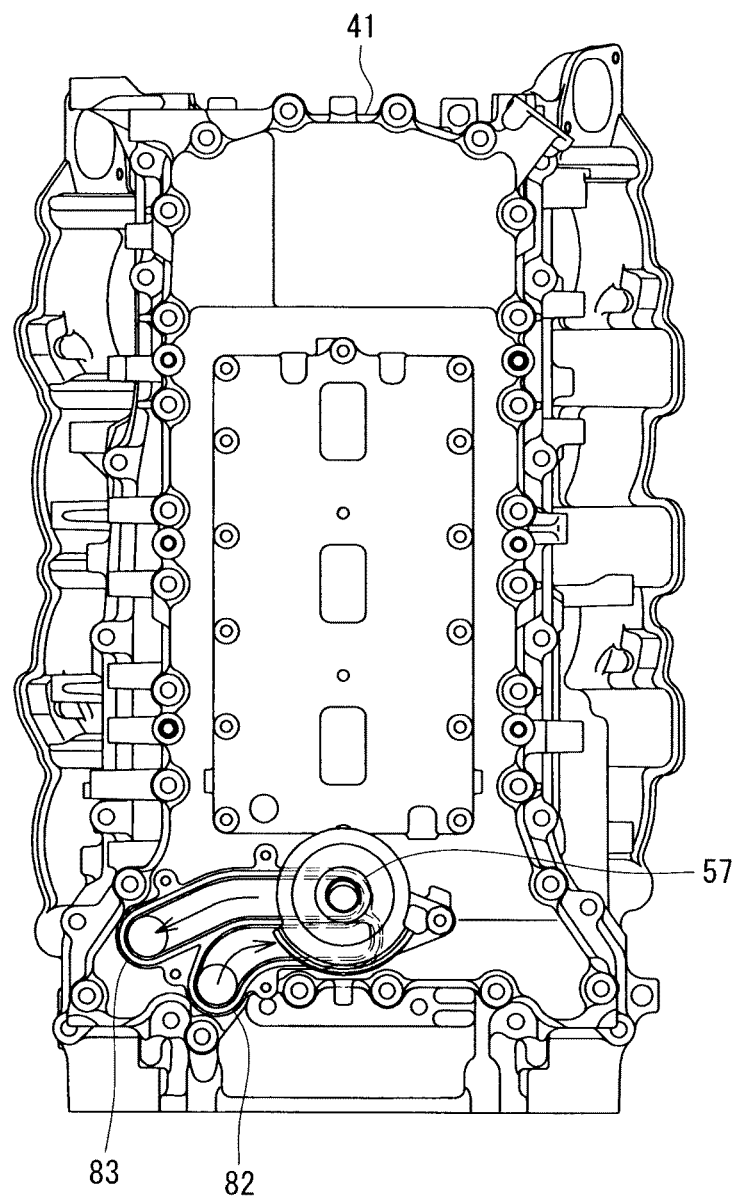
FIG. 6 shows an oil filter 57 as viewed from the direction A of FIG. 2.

FIG. 3A is a cross-sectional view taken along the line B-B of FIG. 2. FIG. 3B is a cross-sectional view taken along the line E-E of FIG. 3A. FIG. 4A is a cross-sectional view taken along the line C-C of FIG. 3. FIG. 4B is an enlarged cross-sectional view of a portion around a fitted plug 76 of FIG. 4A. FIG. 5 is a cross-sectional view taken along the line D-D of FIG. 3. FIG. 6 shows the oil filter 57 as viewed from the direction A of FIG. 2.

As shown in FIGS. 3A to 5, a main gallery 73 is provided in the cylinder block 43 and parallel to the crank axis. In the case where the engine 31 is a water-cooled 4-cycle V-8 engine, the eight cylinders 52 may be arranged in two banks so as to form a V-shape in a horizontal plane, and the main gallery 73 may be arranged in a portion of the cylinder block 43 between the two V-banks of the cylinders 52.

As shown in FIG. 3A, an oil passage 80 is provided in the exhaust guide 36 to guide lubrication oil sucked by an oil strainer 58 into the oil pump 55. An oil relief valve 74 is also provided in the exhaust guide 36 to always keep the hydraulic pressure of the lubrication oil pumped from the oil pump 55 at a specified value. As shown in FIG. 3B, an oil leak hole 75 is provided in the oil relief valve 74 to let lubrication oil accumulated in oil passages 82, 84 upstream of the oil filter 57 shown in FIG. 5 flow into the oil pan 56. The oil leak hole 75 may be used as the upstream oil return path 14 shown in FIG. 1. The diameter of the oil leak hole 75 is preferably small to avoid an adverse effect on the rise in hydraulic-pressure at the start of engine operation. However, in the case where the diameter of the oil leak hole 75 is too small, it takes a long time to clear lubrication oil accumulated in the oil passages 82, 84 upstream of the oil filter 57 when the engine is stopped. Therefore, the diameter of the oil leak hole 75 should be determined in consideration of the rise in hydraulic pressure required at the start of engine operation and the time allowed to clear lubrication oil. The diameter of the oil leak hole 75 may be about 1 mm, for example.

As shown in FIG. 3A, the cylinder block 43 is provided with an oil inlet port 71 arranged to allow lubrication oil guided via the oil passage 80 to flow into the oil pump 55, and an oil outlet port 72 arranged to allow lubrication oil pumped by the oil pump 55 to flow out.

As shown in FIGS. 3A to 5, oil passages 86, 81, 87 are provided in the cylinder block 43 to guide lubrication oil filtered by the oil filter 57 into the main gallery 73. As shown in FIGS. 3 and 4, oil passages 77 are provided in the partition walls 59 to guide lubrication oil guided by the main gallery 73 to the sliding surfaces of the crankshaft 51.

As shown in FIGS. 3A to 5, the cylinder block 43 is provided with a hollow portion 79 opening into the crankcase 42 and communicating with the oil passage 87. A fitted plug 76 arranged to block the oil passage 87 is fitted in the hollow portion 79. The hollow portion 79 may be used to define the oil passage 87 in the cylinder block 43 by drilling from the outside of the cylinder block 43. However, the hollow portion 79 is not necessary to guide the lubrication oil.

An oil leak hole 78 is provided in the fitted plug 76 to allow lubrication oil accumulated in oil passages 83, 85, 86, 81, 87, 77 and the main gallery 73 downstream of the oil filter 57 to drain into the oil pan 56. The oil leak hole 78 may be used as the downstream oil return path 15 shown in FIG. 1. The diameter of the oil leak hole 78 is preferably small in order not to adversely affect the rise in hydraulic pressure at the start of engine operation. However, in the case where the diameter of the oil leak hole 78 is too small, it takes a long time to clear lubrication oil accumulated in the oil passages 83, 85, 86, 81, 87, 77 and the main gallery 73 downstream of the oil filter 57 when the engine is stopped. Therefore, the diameter of the oil leak hole 76 should be determined in consideration of the rise in hydraulic pressure required at the start of engine operation and the time allowed to clear lubrication oil, and in consideration of the balance with the amount of oil leaking from the oil leak hole 75 provided in the oil relief valve 74 shown in FIG. 3. The diameter of the oil leak hole 75 may be about 1.2 mm, for example.

As shown in FIG. 5, the crankcase 42 is provided with the oil passage 84 arranged to guide lubrication oil pumped by the oil pump 55 into the oil filter 57, and the oil passage 85 arranged to guide lubrication oil filtered by the oil filter 57 into the main gallery 73.

As shown in FIGS. 5 and 6, the crank cover 41 is provided with the oil passage 82 arranged to guide lubrication oil guided via the oil passage 84 into the oil filter 57, and the oil passage 83 arranged to guide lubrication oil filtered by the oil filter 57 into the main gallery 73.

As shown in FIGS. 2 to 6, when the engine 31 shown in FIG. 2 operates, reciprocal motion of the pistons 53 provided in the cylinders 52 is transmitted via the connecting rods 54 to the crankshaft 51 and converted into rotational motion. As the crankshaft 51 rotates, the oil pump 55 operates to suck lubrication oil accumulated in the oil pan 56 via the oil strainer 58, as indicated by the solid arrows in FIG. 3. The lubrication oil is guided through the oil passage 80 into the oil inlet port 71, and flows from the oil inlet port 71 into the oil pump 55. After flowing into the oil pump 55, the lubrication oil is pumped from the oil outlet port 72, and guided into the oil filter 57 sequentially through the oil passages 84, 82 shown in FIG. 5. After being filtered by the oil filter 57, the lubrication oil is delivered to the main gallery 73 sequentially through the oil passages 82, 85, 86, 81, 87 shown in FIG. 5, and is guided in parallel to the crank axis of the crankshaft 51, as shown in FIG. 4. The lubrication oil guided by the main gallery 73 is distributed to the oil passages 77. Thus, the lubrication oil is delivered to and lubricates the sliding surfaces of the crankshaft 51, and then falls down and returns through an oil return passage 60 into the oil pan 56 via the crankcase 42 or the cylinder block 43.

When the engine 31 shown in FIG. 2 is stopped, on the other hand, the oil pump 55 is also stopped. Thus, lubrication oil accumulated in the oil passages 84, 82 upstream of the oil filter 57 shown in FIG. 5 flows back through the oil passages 84, 82, and returns into the oil pan 56 via the oil leak hole 75 provided in the oil relief valve 74 shown in FIG. 3, as indicated by the dashed arrows. The lubrication oil accumulated in the oil passages 84, 82 upstream of the oil filter 57 is cleared in this way.

Meanwhile, lubrication oil accumulated in the oil passages 83, 85, 86, 81, 87, 77 and the main gallery 73 downstream of the oil filter 57 shown in FIGS. 3 to 5 flows back through the oil passages 83, 85, 86, 81, 87, 77 and the main gallery 73, and returns into the oil pan 56 via the oil leak hole 78 provided in the fitted plug 76 and through the inside of the crankcase 42, as indicated by the dotted arrows. The lubrication oil accumulated in the oil passages 83, 85, 86, 81, 87, 77 and the main gallery 73 downstream of the oil filter 57 is cleared in this way. In addition, lubrication oil accumulated in a space inside the oil filter 57 downstream of a filter paper is also cleared.

The oil leak hole 78 can be formed by fitting the fitted plug 76 in which the oil leak hole 78 is formed into the hollow portion 79, without processing the cylinder block 43 and the crankcase 42, to allow lubrication oil accumulated in the oil passages 83, 85, 86, 81, 87, 77 and the main gallery 73 downstream of the oil filter 57 to return into the oil pan 56. The configuration not only facilitates forming the oil leak hole 78 but also reduces the diameter of the oil leak hole 78 without complicating the manufacturing process. Thus, even in the case where the oil leak hole 78 leading to the oil passage 87 downstream of the oil filter 57 is provided, it is possible to minimize the adverse effect on the rise in hydraulic pressure at the start of engine 31 operation, and to minimize the cost increase.

In the second preferred embodiment discussed above, the oil leak hole 78 is provided in the fitted plug 76 to allow lubrication oil accumulated in the oil passages 83, 85, 86, 81, 87, 77 and the main gallery 73 downstream of the oil filter 57 to return into the oil pan 56. However, an oil leak hole may be provided by directly processing the cylinder block 43 and the crankcase 42 to allow lubrication oil accumulated in the oil passages 83, 85, 86, 81, 87, 77 and the main gallery 73 downstream of the oil filter 57 to return into the oil pan 56.

Figure 7:
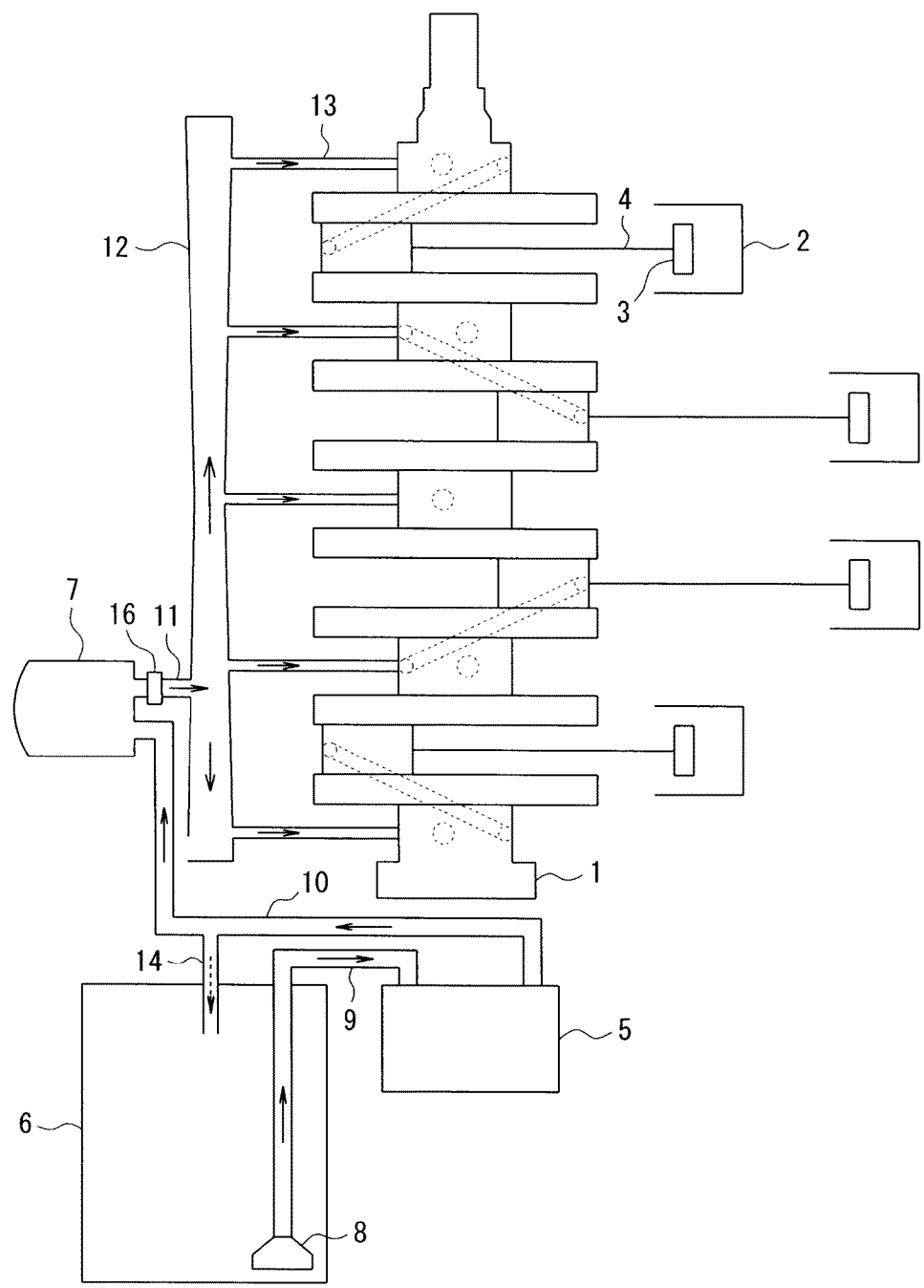
FIG. 7 is a cross-sectional view schematically showing the configuration of a lubrication system for an outboard motor in accordance with a third preferred embodiment of the present invention.

FIG. 7 is a cross-sectional view schematically showing the configuration of a lubrication system for an outboard motor in accordance with a third preferred embodiment of the present invention. The same components as those of FIG. 1 are denoted by the same reference numerals, and detailed descriptions thereof will be omitted.

As shown in FIG. 7, a check valve 16 is provided in the oil passage 11 downstream of the oil filter 7, rather than the downstream oil return path 15 connected to the main gallery 12 shown in FIG. 1. The check valve 16 allows the passage of lubrication oil discharged from the oil outlet port of the oil filter 7, but hinders the passage of lubrication oil flowing back into the oil outlet port of the oil filter 7.

When the engine is operating, lubrication oil discharged from the oil outlet port of the oil filter 7 is delivered via the check valve 16 into the main gallery 12 to lubricate the sliding surfaces of the crankshaft 1.

When the engine is stopped, on the other hand, the check valve 16 hinders lubrication oil accumulated in the oil passages 11, 13 and the main gallery 12 downstream of the oil filter 7 from flowing back in the direction of the oil filter 7.

The configuration prevents lubrication oil accumulated in the oil passages downstream of the oil filter 7 from returning in the direction of the oil filter 7 when the engine is stopped, without permitting the lubrication oil from leaking from the oil passages downstream of the oil filter 7. Thus, it is possible to prevent lubrication oil accumulated in the oil passages downstream of the oil filter 7 from flowing to the outside without adversely affecting the rise in hydraulic pressure at the start of the engine operation.

In the preferred embodiment shown in FIG. 7, the check valve 16 is provided in the oil passage 11 downstream of the oil filter 7. However, an electromagnetic valve may be provided in the oil passage 11 downstream of the oil filter 7. In the case where an electromagnetic valve is used, the electromagnetic valve may be controlled so as to open when the engine is operating and close when the engine is stopped.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lubrication system for an outboard motor, the lubrication system comprising:
   an oil passage arranged to guide lubrication oil to a movable member of an engine;
   an oil pump arranged to pump the lubrication oil into the oil passage;
   an oil filter arranged to filter the lubrication oil to be guided to the movable member;
   an oil return passage arranged to guide lubrication oil from the movable member of the engine to an oil pan;
   a first oil return path connected to the oil passage downstream of the oil filter and upstream of the movable member of the engine, the first oil return path arranged to return the lubrication oil that is accumulated in a portion of the oil passage downstream of the oil filter to the oil pan; and
   a second oil return path arranged to return the lubrication oil that is accumulated in a portion of the oil passage upstream of the oil filter to the oil pan.

2. The lubrication system for an outboard motor according to claim 1, wherein the first oil return path is disposed entirely below the oil filter.

3. The lubrication system for an outboard motor according to claim 1, wherein the oil passage includes a main gallery, and the first oil return path is connected to a lower end of the main gallery provided in a cylinder block and parallel or substantially parallel to a crank axis.

4. The lubrication system for an outboard motor according to claim 3, further comprising:
   a hollow portion in the cylinder block arranged to communicate with the portion of the oil passage downstream of the oil filter, the hollow portion opening into a space communicating with the oil pan; and
   a fitted plug in the hollow portion arranged to block the oil passage communicating with the hollow portion; wherein
   the first oil return path includes an oil leak hole provided in the fitted plug.

5. The lubrication system for an outboard motor according to claim 1, further comprising an electromagnetic valve provided in the first oil return path and arranged to open and close according to operation of the engine.

* * * * *